June 13, 1967 D. R. WEBER 3,325,601

SIGNAL PREDICTION TECHNIQUES FOR EFFECTING BANDWIDTH COMPRESSION

Original Filed Sept. 11, 1961 3 Sheets-Sheet 1

INVENTOR:
Donald R. Weber
By Smyth, Roston & Pavitt
Attorneys.

INVENTOR
Donald R. Weber
By Smyth, Roston & Pavitt
Attorneys

INVENTOR:
Donald R. Weber
By Smyth, Roston & Pavitt
Attorneys 3,325,601

SIGNAL PREDICTION TECHNIQUES FOR EFFECTING BANDWIDTH COMPRESSION

Donald R. Weber, Canoga Park, Calif., assignor to Packard-Bell Electronics Corporation, Los Angeles, Calif., a corporation of California Continuation of application Ser. No. 137,302, Sept. 11, 1961. This application Aug. 11, 1966, Ser. No. 571,943
26 Claims. (Cl. 179—15.55)

This is a continuation of application Ser. No. 137,302, filed Sept. 11, 1961.

The present invention relates to data processing means and, more particularly, to means for transmitting large amounts of data within a narrow band width and/or with a high signal-to-noise ratio.

At the present time, it is frequently desirable to monitor various physical characteristics of a device such as pressures, temperatures, accelerations, etc. In order to do so, one or more transducers responsive to the characteristic to be measured may be provided on the device for producing an electrical signal proportional thereto. The transducers may then be interconnected with suitable recording means, data processing means or other utilization means. Since it is frequently desirable for the utilization means to be disposed a substantial distance from the transducers, it may be necessary to telemeter the data from the transducers to the utilization means by means of closed wire circuits or even by means of a radio link. In those instances where there are a large number of transducers that provide a corresponding number of channels of information, the amount of power required to telemeter the data and/or the amount of band width required therefor has heretofore frequently imposed severe limitations on the equipment required as well as the amount of data which can be transmitted.

In the broadcasting of television pictures, at the present time it is customary to transmit large volumes of data in order to obtain a picture of adequate quality. However, since a major portion of a picture changes very little from frame to frame, a correspondingly large portion of the data that is transmitted is redundant. This in turn requires a band width that is considerably wider than is theoretically necessary.

As a result, a large amount of effort has been devoted to reducing the bandwidth required for transmitting data signals. Although such efforts have provided some improvements, they have not been entirely successful in reducing the bandwith and/or the amounts of power to transmit the signals.

It is now proposed to provide means for transmitting data signals that will be effective to overcome the foregoing difficulties. More particularly, it is proposed to provide a system wherein data signals may be transmitted within a very narrow bandwidth with a minimum amount of power and/or the data signal may be received with a high signal-to-noise ratio. More particularly, it is proposed to provide a telemetering system that is adapted to receive at least one channel of data signals relating to a function to be monitored and to eliminate from the data signals the redundant portions thereof and to transmit only sufficient portions of the signals to insure an accurate and complete set of data being telemetered.

It has been found that although some portions of the data signals that are normally telemetered vary in a random or unpredictable manner, a substantial portion of the data varies in a predicable manner over extended periods of time. For example, characteristics such as pressure, temperatures, accelerations, etc. may be subjected to transient conditions when they fluctuate in a random or erratic manner. However, during extended periods of the time, they vary in a predictable manner, i.e. the data will vary in accordance with some mathematical formula or recognizable pattern. More particularly, they may remain constant or vary as a straight line function. Under such circumstances, once a set of data signals are transmitted, the recognizable pattern or formula for predicting future data signals will be defined and accordingly any additional signals are obviously redundant. It may thus be seen that once enough data has been transmitted to define a formula for predicting future signals to be transmitted, any additional data signals will be redundant and need not be transmitted.

It is therefore proposed to provide means for transmitting only sufficient data signals to accurately define the function being transmitted and to reduce or eliminate the transmission of the redundant portions. This is to be accomplished by providing means within the telemetering system for determining if the data signals are inter-related by some predetermined characteristic or mathematical formula and to permit the transmission of only sufficient data to insure an accurate determination of the formula. The nature of the data will vary with the characters of the effects to be monitored and accordingly the data may be defined by a wide assortment of mathematical expressions. This in turn will necessitate embodying the present invention in a structure that is particularly adapted to be employed with the particular data being processed. As one example of such a structure reference may be had to the following description of one embodiment of the invention and to the drawings wherein:

Figure 1:
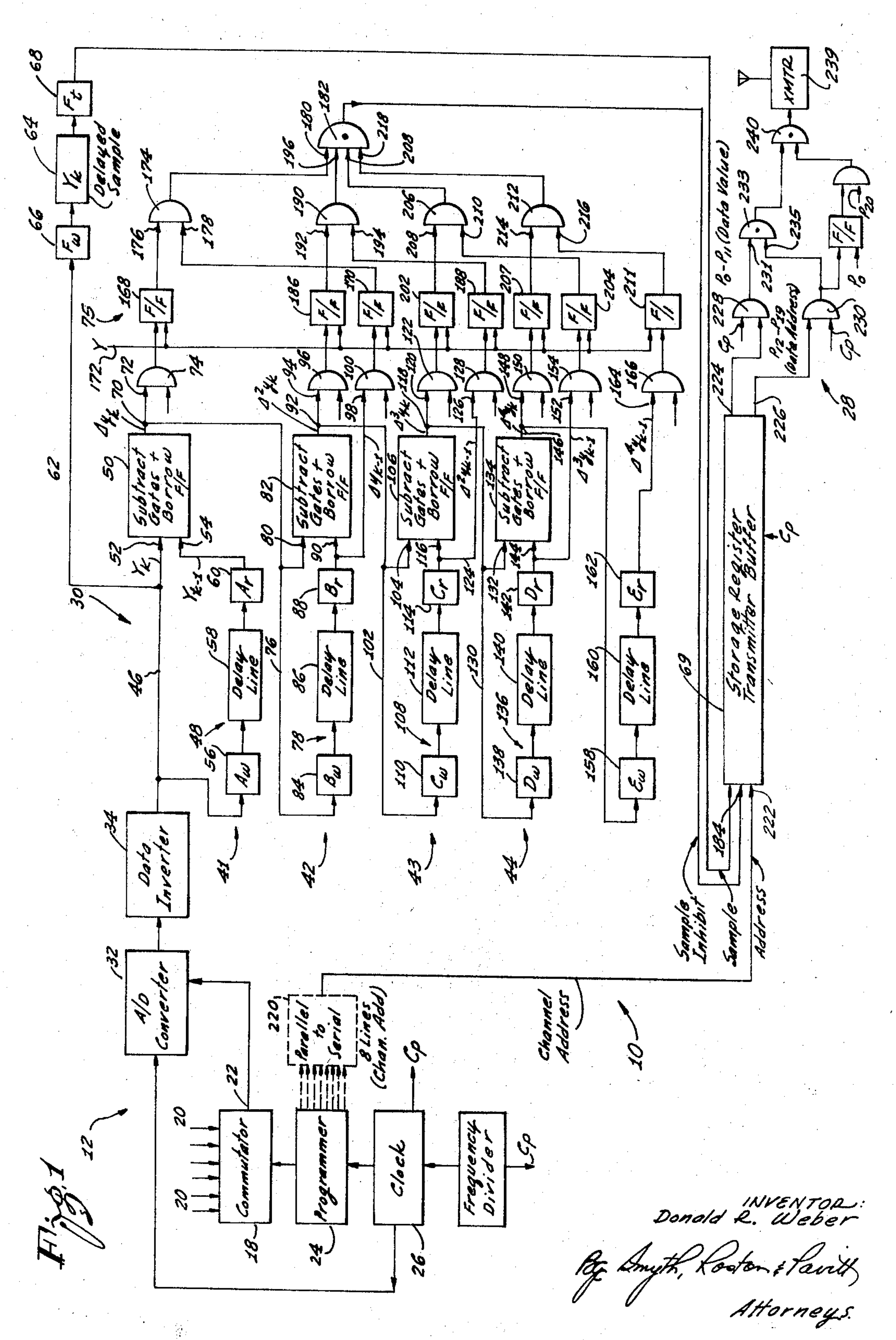
FIGURE 1 is a block diagram of a transmitting system for use in a telemetering system.

Referring to the drawings in more detail, the present invention is particularly adapted to be embodiment in a telemetering system 10 for relaying or transmitting data from a first station 12 to a second station 14 that is located remote therefrom by means of electromagnetic radiations.

The first station 12 as disclosed in FIGURE 1 includes data acquisition means which includes a plurality of transducers (not shown). The transducers may be of any suitable variety for sensing physical effects and producing continuous electrical signals proportional thereto. For example, the transducers may be thermocouples that will provide a signal proportional to the temperatures, tachometers that will provide a signal proportional to revolutions per minute, accelerometers that will provide a signal proportional to acceleration, a strain gauge that will provide a signal proportional to a pressure or load on a member. The foregoing are merely cited as a few examples of the wide variety of signal sources that may be employed and it should be understood that a signal source suitable for measuring any desired physical effect may be employed.

Normally such transducers will provide continuous signals in real time wherein the instantaneous value thereof at any given instant will be proportional to the instantaneous value of the physical effect being measured at that instant. Although some of these electrical signals may vary in a random or unpredictable manner, particularly during transient conditions, it has been found that a majority of the effects to be measured vary in a highly predictable manner during at least a portion of the time. That is, the manner in which the effect varies may be expressed or very closely approximated in terms of a mathematical formula. Although the functions may be of an exponential or periodic nature, it has been found that a large majority of the naturally occurring functions vary according to a polynomial formula or may be very closely approximated by a polynomial formula during extended intervals.

Speeds, accelerations, stresses, temperatures, pressures, etc. are frequently the subject of measurements and frequently during the extended intervals they are substantially constant (i.e. they may be defined by a zero order polynomial). During the intervals of uniformity, they may vary according to a straight line (i.e. they may be defined by a first order polynomial), or they may vary according to a higher order polynomial. Accordingly, it is apparent that the signals from the transducers will normally contain a large amount of data that may be predicted by means of an appropriate polynomial formula and is therefore redundant. If the data is occurring according to a zero order polynomial (i.e. constant), a single signal will define the function. If the data is occurring according to a first order polynomial (i.e. straight line) a pair of signals will define the function and more generally when the data may be defined by an Nth order polynomial, $N+1$ signals will define the polynomial and any additional signals will be redundant.

Each of the transducers may be interconnected with one of the inputs to a commutator 18 which has a separate input 20 for each of the transducers and a single output 22. The commutator may be of any design suitable for periodically sampling each of the signals from the transducers in some predetermined sequence and providing a series of sample signals at the output. If the commutator 18 is required to sample several hundred transducers and/or is required to operate at high sampling rate, it is preferably an electronic device that may be controlled by a suitable signal. In the present instance, the commutator is interconnected with a programmer 24 which is in turn interconnected with a clock 26. The clock may be effective to provide a timing or clock pulse at a suitable frequency such as 250 kc. that will be effective to synchronize the operation of the programmer and commutator with the remainder of the system 10.

The programmer 24 may be effective to cause the commutator 18 to periodically sample each and every one of the signals from the various transducers at least once during each frame or period therefor. The commutator inputs 20 will thus receive continuously varying real time signals while the output 22 will provide a series of pulses that will consist of a plurality of pulse trains. Each train corresponds to the signals from one transducer and the pulses therein will have amplitudes that correspond to the instantaneous amplitudes of the corresponding input signals at the time of the samples. The amplitudes of the pulses in each train will vary in the same manner as the original signal and will be redundant or non-redundant in the identical manner.

Accordingly, the output 22 from the commutator 18 may be interconnected with the transmitting portion 28 of the station 12 by means of data processing means 30 that will be effective to determine when the signals are varying in a random manner and when they are varying in a predictable manner and if the signals are varying in a predictable manner the data processing will be effective to eliminate redundant data so as to prevent said transmitter portion transmitting such data.

As previously stated, the data signals may vary according to virtually an unlimited variety or types of functions and the amount of redundancy therein may also vary. However, since the data which is to be measured by the present system will normally contain very large amounts of data that occur according to polynomial expressions, the present data processing means is particularly adapted to recognize the existence of polynomials of a relatively low order, for example, the third order or less. In the event this does not provide adequate compression, the data processing means may be adapted to recognize higher order polynomials or even different forms of functions.

Since the pulses from the commutator are amplitude modulated, the input to the data processing means 30 includes an analogue-to-digital converter 32 that will be effective to convert each of the amplitude modulated pulses into binary coded pulses. In the present instance, as may be seen from FIGURE 2, the format of the transmitted word will include a space bit $P_0$, a sign bit $P_{11}$ and magnitude bits $P_1$ through $P_{10}$ that represent the amplitude of the pulse from the commutator 18. It should be noted that since the signals fed into the converter 32 are amplitude modulated they vary in a continuous manner. However, since this signal has to be connected into a limited number of pulses $P_1$ to $P_{11}$ the output from the converter 32 will vary in finite increments which are equal to the magnitude of the bits. Thus in the process of converting from an analog function to a digital function there will be a quantizing error introduced into the signal $y$. If the binary output signal from the converter 32 will have the least significant bit first and the remaining portions of the system requires the most significant bit first, a data inverter 34 may be interconnected with the output of the converter 32 so as to reverse the order of the bits and place the most significant bit first.

Since in the present instance it is only desired to determine the existence of data that is occurring to a polynomial expression, a plurality of differentiating circuits 41, 42, 43 and 44 may be interconnected with the output of the inverter 34 for successively differentiating the signals in each train. For purposes of illustration, the following description will be limited to the processing of the pulses $y$ in a single train. It will of course be apparent that the signals in each of the trains in the entire series will be processed in a similar manner. The signal from the transducer for the $y$ train is constant, the pulses $y$ will be of constant value and the data signal will be occurring according to a zero order polynomial. Therefore, the difference between $y_k$ (occurring at time $k$) and $y_{k+1}$ (occurring at time $k+1$) will be zero. Thus, the first incremental differential $\Delta y_k$ of a zero order polynomial will always go to zero on the first sample and will remain at zero until a new function is established. For a straight line or a first order polynomial the second incremental differential $\Delta^2 y_k$ will always go to zero on the second sample and will remain there until a new function is established. Similarly, the third and fourth incremental differentials $\Delta^3 y_k$ and $\Delta^4 y_k$ will go to zero on the third sample and fourth sample respectively for a second and third order polynomial. Accordingly, if the data is of a nature where an adequate reduction in the amount of transmitted data can be obtained by eliminating only polynomials of the third order or less only four differentiating circuits may be provided. In the event an additional reduction of worthwhile magnitude can be accomplished by eliminating redundancy resulting from data occurring according to higher order polynomials a greater number of differentiating circuits may be employed. More particularly, by providing $N+1$ differentiating circuits, an Nth order polynomials will be detectable and the redundancy therefore eliminated.

The first differentiating circuit 41 includes two branches 46 and 48, each of which extends between the output of the data inverter 34 and one of the inputs 52 or 54 of a comparator circuit. The comparator circuit may be adapted to compare the two signals on the inputs 52 and 54 and provide a difference signal. This circuit may be of any suitable design such as a half adder or an arithmetic subtractor 50. The subtractor 50 may be of a conventional variety for providing an output signal that will be a function of the difference between the signals on the two inputs 52 and 54. In the present instance, the subtractor is particularly adapted to subtract the input signal on one input 54 from the signal on the other input 52 and thereby produce a difference signal which is actually the arithmetic difference.

The first branch 46 comprises an electrical conductor that extends directly from the output of the inverter 34 to the input 52 so as to carry the signal to the input 52 virtually free of any time delay. Accordingly, the first input 52 will receive the signal $y_k$. The second branch 48 includes any means suitable for delaying the signal therein by an amount substantially equal to the frame time of the commutator 18. This branch 48 may include a shift register or as shown in the drawing it may comprise a write amplifier 56, a delay line 58 and a read amplifier 60 and extends from the output of the inverter 34 to the second input 54 so as to feed a signal to the second input 54 with a time delay equal to that of the line 58. The delay line 58 may be of any suitable variety such as a magnetostrictive member and preferably has a time delay which is substantially identical to the frame period of the commutator 18. That is the time delay will be identical to the interval between the time the commutator successively samples the same signal. In other words, the delay time will be equal to the period between the pulses $y_k$ and $y_{k-1}$ in the same train. As a result, the output from the second branch 48 will be the sample signal $y_{k-1}$ preceding sample signal $y_k$ in the first branch 46. Thus, the first input 52 will receive the signal $y_k$ and the second input 54 will receive the next succeeding signal $y_{k-1}$.

A conductor 62 may be connected to the first branch 46 so as to supply the signal $y_k$ to a delay line 64 that is fed by a write amplifier 66 and feeds into a read amplifier 68. The read amplifier 68 is in turn connected to the input 67 of a register 69. The register 69 forms a part of the transmitter portion 28 and is adapted to store the data signals at a random rate and feeds them at a substantially uniform rate to the remainder of the transmitter portion 28. The time delay of the delay line 64 is preferably approximately equal to the length of the sample signal. Since all of the differential signals may be obtained simultaneously within this interval, the time delay in line 64 will permit a decision to be made as to whether or not the data signal $y_k$ needs to be transmitted before it passes out of the register.

The subtractor 50 will be effective to subtract the data signal $y_{k-1}$ on the input 54 from the second data signal $y_k$ on the input 52 and provide a difference signal $\Delta y_k$ on the output 70. This difference signal will be equal to the first incremental differential $\Delta y_k$. In the event the signal $y$ is constant (i.e. is defined by a zero order polynomial), the signals $y_k$ and $y_{k-1}$ will be equal to each other and accordingly the incremental differential $\Delta y_k$ will be zero, and will remain equal to zero as long as the signal $y$ remains a constant. As a result, the continuous presence of a signal at the output from the subtractor 50 which is equal to zero indicates that the data is occurring according to a zero order polynomial. Thus, if the differential signal $\Delta y$ remains equal to zero, and if the signal $y_{k-1}$ was transmitted, the signal $y_k$ must be transmitted. Additional data signals will be redundant and need not be transmitted as long as they are constant. It may thus be seen that the presence of a zero difference signal at the output 70 of the subtractor 50 may be used to inhibit the transmission of additional data signals. However, for reasons that will become apparent subsequently, the presence of a differential signal $\Delta y_k$ if preceded by differential signal $\Delta y_{k-1}$ also equal to zero is employed as an inhibit signal. Accordingly, the output 70 from the subtractor 50 may be connected to one input 72 of an "AND" gate 74 forming a part of inhibiting means 75 for controlling the register 69.

In the event the signals $y_k$ and $y_{k-1}$ result from a function that is unpredictable, or is occurring according to a first or higher order polynomial, the differential signal $\Delta y_k$ will not be equal to zero. The second differentiating circuit 42 may be substantially identical to the first circuit 41 and will be effective to provide an additional differential signal. This circuit 42 comprises a first branch 76 and a second branch 78. The first branch 76 is connected directly from the output 70 of the first subtractor 50 to one input 80 to a second subtractor 82. The first incremental differential signal $\Delta y_k$ will thus be supplied to the input 80 with virtually no time delay. The second branch 78 includes a write amplifier 84, a delay line 86 and a read amplifier 88. The input to the write amplifier 84 is connected to the output 70 of the first subtractor 50 while the output of the read amplifier 88 is connected to the second input 90 to the subtractor 82. The delay line 86 may be a magnetostrictive member similar to the first delay line and having a time delay substantially identical to the period of the commutator or the interval between the succeeding data signals $y_{k-1}$ and $y_k$ in the same train. Thus the incremental differential $\Delta y_{k-1}$ will arrive at the input 80 at the same time as the differential signal $\Delta y_k$ arrives at the input 90. The subtractor 82 is substantially identical to the first subtractor 50 and will be effective to subtract signal $\Delta y_{k-1}$ on the input 90 from the signal $\Delta y_k$ on the input 80. The subtractor 82 will thereby provide the difference between these two signals which is the second incremental differential or $\Delta^2 y_k$.

It should be noted that the second incremental differential signal $\Delta^2 y_k$ will appear at the output 92 of the subtractor 82, at virtually the same time as the first incremental differential $\Delta y_k$ appears at the output 70 of the subtractor 50. In the event the data is occurring according to a straight line function i.e. a first order polynomial, the slope of the line or the first incremental differentials $\Delta y_k$ will be constant. As a result, the difference therebetween on the second incremental differential $\Delta^2 y_k$, will be zero. Thus, the second differential signal $\Delta^2 y_k$ at the output 92 from the subtractor 82 will become equal to zero and will remain at zero until a new function is established. Since the presence of a second differential $\Delta^2 y_k$ equal to zero will indicate a constant or straight line function, the data signals $y_{k-1}$ and $y_k$ will be adequate to define the function. Accordingly, if the differential signal $\Delta^2 y_k$ is equal to zero, and was preceded by a zero this may be used to inhibit the transmission of data signal $y_{k+1}$ and any additional signals. Thus, output 92 may be connected to one input 94 of an "AND" gate 96 forming a part of the inhibit means 75 for controlling the register 69. The output of the read amplifier 88 which will have the first incremental differential $\Delta y_{k-1}$ thereon, may be connected to the input 98 of an "AND" gate 100 in the inhibit means 75. If the data signals are varying in an unpredictable manner, or according to a second order or higher polynomial, the second differential $\Delta^2 y$ will not be equal to zero, and the number of data signals has not reached a sufficient volume to contain redundant data as a result of the existence of a polynomial.

The third differential circuit 43 may be substantially identical to the first and second circuits in that it includes a first branch 102 which extends from the output 92 of the subtractor 82 to the input 104 of a third subtractor 106 so as to supply the $\Delta^2 y_k$ signals thereto with little or no time delay. In addition this circuit includes a second branch 108 which has a write amplifier 110, a delay line 112 and a read amplifier 114 which is interconnected with the second input 116 to the subtractor 106. This line may be substantially identical to the preceding delay lines and includes a time delay substantially equal to the period of the commutator. As a result, output from the second branch 108 will include the second incremental differential $\Delta^2 y_{k-1}$ while the first branch 102 includes the second incremental differential $\Delta^2 y_k$.

The subtractor 106 is similar to the preceding subtractors and will subtract the signal $\Delta^2 y_k$ on the input 116 from the signal $\Delta^2 y_{k-1}$ on the input 104. The difference between these signals will be the third incremental differential or $\Delta^3 y_k$ and will be present on the output 118.

In the event the data signals $y_k$, $y_{k-1}$ and $y_{k-2}$ have been occurring according to a polynomial of the second order or less, the third differential $\Delta^3 y_k$ will be equal to zero and will remain equal to zero until a new function is established. Since three signals $y_k$, $y_{k-1}$ and $y_{k-2}$ will be adequate to define such polynomial, no further signals need be transmitted. Thus if the third differential $\Delta^3 y_k$ is equal to zero and was preceded by a zero it may be used to inhibit the transmission of additional data signals. Accordingly, the output 118 from the subtractor 106 may be connected to an input 120 to the "AND" gate 122 in the inhibit means 75. The output from the branch 108, i.e. $\Delta^2 y_{k-1}$ may be fed over a conductor 124 to an input 126 to an "AND" gate 128.

The fourth differential circuit 44 may be substantially identical to the first, second and third circuits 41, 42 and 43 in that it includes a first branch 130 which extends from the output 118 of the third subtractor 106 to the input 132 of a fourth subtractor 134 so as to supply the third incremental differential signals $\Delta^3 y_k$ thereto with little or no time delay.

In addition, this circuit 44 includes a second branch 136 which has a write amplifier 138, a delay line 140 and a read amplifier 142 which is interconnected with the second input 144 to the subtractor 134. This line 140 may be substantially identical to the preceding delay lines and has a time delay substantially equal to the period of the commutator 18. As a result, the signal from the second branch 136 will include the third incremental differential $\Delta^3 y_{k-1}$ while the first branch 130 includes the third incremental differential $\Delta^3 y_k$.

The subtractor 134 may be similar to the preceding subtractors 50, 82 and 106 and will subtract the signal $\Delta^3 y_{k-1}$ on the input 144 from signal $\Delta^3 y_k$ on the input 132. The difference between these signals appear on the output 146 and will be the fourth incremental differential $\Delta^4 y_k$. In the event the data signals $y_k$, $y_{k-1}$, $y_{k-2}$ and $y_{k-3}$ have been occurring according to a polynomial of the third order or less, the fourth differential $\Delta^4 y_k$ will be equal to zero and will remain equal to zero until a new function is established. Since the four signals $y_k$, $y_{k-1}$, $y_{k-2}$ and $y_{k-3}$ will be adequate to define such a polynomial, no further data signals need be transmitted. Thus, when the fourth differential signal $\Delta^4 y$ is equal to zero and was preceded by a fourth differential equal to zero transmission of additional data signals may be inhibited. Accordingly, the output 146 from the subtractor 134 may be connected to an input 148 to the "AND" gate 150 in the inhibit means 75. The output from the branch may be connected to an input 152 and to an "AND" gate 154 by means of a conductor 156 so as to feed the fourth incremental differential $\Delta^3 y_{k-1}$ thereto. The output 146 from the subtractor 134 may also be connected to a wire amplifier 158 that feeds a fifth delay line 160 having a delay time equal to that of the preceding lines. Since this line will delay the signal therein by the period of the commutator 18 the output will be $\Delta^4 y_{k-1}$. The output of the line 160 may be connected to a read amplifier 162 that feeds one input 164 to an "AND" gate 166 in the inhibit means 75.

The inhibit means 75 for controlling the register 69 includes a plurality of inputs 72, 94, 98, 120, 126, 148, 152 and 164 that are formed by the various "AND" gates 74, 96, 100, 122, 128, 150, 154 and 166. The inputs 72 and 98 of the "AND" gates 74 and 100 are connected to the outputs from the subtractor 50 and the branch 78. These gates 74 and 100 will thus receive the first differential signals $\Delta y_k$ and $\Delta y_{k-1}$, respectively. The second inputs to both of these gates 74 and 100 are connected to the clock 26 so as to receive the clock pulse signal C*p*. In the event the signal $\Delta y_k$ on the input 72 is zero when the clock pulse occurs the output signals from the gate 74 will be zero. Also, if the signal $\Delta y_{k-1}$ on the input 98 is zero when the clock pulse is zero, the output signal from the gate 100 will be zero.

The output from the "AND" gate 74 is connected to a flip-flop 168 while the output of the "AND" gate 100 is connected to a flip-flop 170. Each of these flip-flops 168 and 170 is adapted to be set to one if the output signal from the associated gates 74 and 100 is zero. A reset line 172 may be connected to the flip-flops 168 and 170 so as to reset the flip-flops 168 and 170 in response to the end of the data signal or the bit P*o*. The outputs from the flip-flops 168 and 170 are in turn interconnected with the inputs to an "AND" gate 174. The "AND" gate 174 will be effective to provide a zero output if there is a one on either the input 176 or the input 178, as will occur when the first incremental differentials $\Delta y_{k-1}$ and $\Delta y_k$ are not equal to zero. If the signals on both of the inputs are one, as will incur when the first incremental differentials $\Delta y_{k-1}$ and $\Delta y_k$ are both equal to zero, then the output from the flip-flops 168 and 170 will also be one and the output from the gate 174 will also be zero.

The output from the gate 174 is interconnected with one of the inputs 180 to a "OR" gate 182. The output of the "OR" gate 182 is connected to one input 184 to the recording register 69. The gate 182 is adapted to permit the signal $\Delta y_k$ from the delay line 64 to be recorded only when none of the inputs to the gate 182 are one. It will be seen that if both $\Delta y_k$ and $\Delta y_{k-1}$ are equal to zero, the "AND" gate 174 will supply a one to the input 180 and thus cause the "OR" gate 182 to send an inhibit signal to the register and thus prevent recording the signal $y_k$ therein.

The "AND" gates 96 and 128 are connected to the outputs from the second subtractor 82 and the branch 108. These gates 96 and 128 will thus receive the second incremental differential signals $\Delta^2 y_k$ and $\Delta 2y_{k-1}$, respectively. These gates 96 and 128 are similar to the gates 74 and 100 and also have the second inputs thereto connected to the clock 26 so as to receive the clock pulse signal C*p*. If either of the signals $\Delta^2 y_k$ or $\Delta^2 y_{k-1}$ is zero when the clock pulse occurs the signals on the outputs of the gates 96 and 128 will be zero.

The outputs from the "AND" gates 96 and 128 are connected respectively to the flip-flops 186 and 188. Each of these flip-flops 186 and 188 is connected to the reset line 172 and is adapted to be set to one if the associated gates 96 and 128 has a zero output. The flip-flops 186 and 188 in turn have the outputs thereof interconnected with the inputs to a second "AND" gate 190. If either the input 192 or the input 194 has a zero signal thereon, as will occur if either $\Delta^2 y_k$ or$\Delta^2 y_{k-1}$ is not equal to zero, the output of the gate 190 will have a zero signal thereon. However, if both of the inputs 192 and 194 remain at one, as will occur if both $\Delta^2 y_k$ and$\Delta^2 y_{k-1}$ are zero, then the output from the gates 96 and 128 will be one and consequently the output from the gate 190 will be one.

The output from the "AND" gate 190 is in turn interconnected with a second input 196 to the "OR" gate 182. Thus, when $\Delta^2 y_k$ and $\Delta^2 y_{k-1}$ are both equal to zero, the output signal from the gate 190 will be one and will cause the gate 182 to send a one signal to the register to inhibit the signal $y_k$ at the delay line 64 being recorded in the register 69. When either $\Delta^2 y_k$ or $\Delta^2 y_{k-1}$ is not equal to zero, flip-flops 186 or 188 provide a zero signal to the gate 190 and will not cause the gate 182 to block the register 69.

The "AND" gates 122 and 154 are connected to the outputs from the subtractor 106 and the branch 136. These gates 122 and 154 will thus receive the third differential signals $\Delta^3 y_k$ and $\Delta^3 y_{k-1}$. The second inputs to both of these gates 122 and 154 are connected to the clock 26 so as to receive the clock pulse signal C*p*. In the event there is not a signal on the input 198 or the input 200 when the clock pulse occurs, the outputs of the gates 122 and 154 will go to zero.

The outputs from the "AND" gates 122 and 154 are connected to flip-flops 202 and 204 which are reset by a signal on the reset line 172. If the input signals obtained from the gates 122 and 154 are zero, the corresponding flip-flops 202 and 204 respecively will be set to one. The flip-flops 202 and 204 are in turn interconnected with the inputs 208 and 210 to an "AND" gate 206 which will provide a one output if both the input 208 and the input 210 have a one signal thereon. If one of the inputs 208 and 210 is at zero, the output from the gate 206 will remain zero.

The "AND" gate 206 is connected to a third input 208 to the "OR" gate 182. Thus, if either $\Delta^3 y_k$ and $\Delta^3 y_{k-1}$ is equal to zero, the "AND" gate 206 will apply a one to the input 206 and cause the "OR" gate 182 to send a one signal to the register 69 so as to prevent the register 69 recording the data signal $y_k$.

The "AND" gates 150 and 166 are connected to the outputs from the subtractor 134 and the delay line 160 and will thus receive the fourth incremental differential signals $\Delta^4 y_k$ and $\Delta^4 y_{k-1}$. Both of these gates 150 and 166 receive the clock pulse signal *Cp* whereby the absence of a signal on the input 148 or the input 168 at the time of the clock pulse will cause the outputs of the gates 150 and 166 to go to zero.

The outputs from the "AND" gates 150 and 166 are in turn connected to flip-flops 207 and 211 and will set one or both flip-flops to one if there is a signal from one or both gates 150 or 166. A signal on the reset line 172 will reset the flip-flops 207 and 211. The flip-flops 207 and 211 are in turn interconnected with the inputs 214 and 216 to an "AND" gate 212. If there is a zero on either of the inputs, as occurs when either $\Delta^4 y_k$ or $\Delta^4 y_{k-1}$ is not zero, the output of that gate 212 will be at zero. If both of the inputs 214 and 216 are at one as when $\Delta^4 y_k$ and $\Delta^4 y_{k-1}$ are both zero, then the outputs from both the gates 150 and 166 will be zero and therefore the output of the gate 212 will be one.

The output of the "AND" gate 212 is connected to a fourth input 218 to the "OR" gate 182. Thus, if both $\Delta^4 y_k$, and $\Delta^4 y_{k-1}$ are equal to zero, the gate 182 will send a one signal to the register 69 and inhibit recording $y_k$ from the delay line 64.

The register 69 is adapted to receive the signals *y* from the delay line 64 and to record the signal so that they may be subsequently reproduced on another line. It may be noted that where there are a large number of channels or trains of data signals being telemetered, although one or more of the channels may be of a nature that requires each and every signal to be transmitted, at least one of the other channels will normally be of a predictable nature whereby only a portion of the data signals in the train need be transmitted. As a result, the signals received by the register 69 will be in a random order and at a random rate. It will therefore be necessary to add an address to the data signals to insure their subsequent identification and time alignment. Accordingly, the programmer 24 may be connected to means for providing an address. In the present instance this means comprises a parallel-to-serial converter 220 that will supply an address to the input 222 to the register 69.

Figure 2:
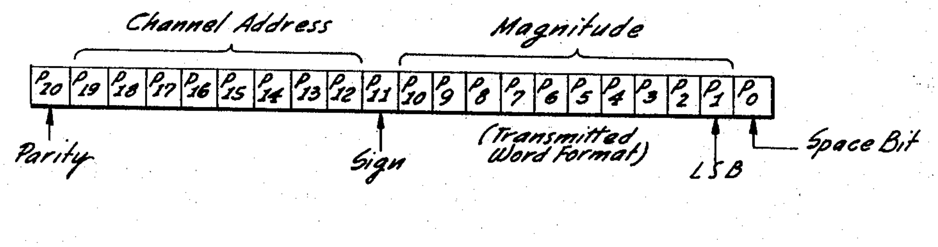
FIGURE 2 is a diagram showing the format of a word normally transmitted by the system.

As may be seen in FIGURE 2 the address will include the bits $P_{12}$ through $P_{19}$ with a parity bit $P_{20}$ being employed to maintain parity for the address. As will become apparent subsequently the knowledge of the fact that a data signal should be transmitted in a given train at a given instance is of considerable value even though the magnitude may be inaccurate. Therefore, in the present instance parity is maintained in the address only. However, it should be noted that any suitable error detection and/or error correction means may be employed in the magnitude portion as well as the address portion.

The outputs 224 and 226 from the register 69 are connected to a pair of "AND" gates 228 and 230 that are controlled by the clock 26. The first gate 228 receives the magnitude pulses $P_0$ to $P_{11}$ and feeds them to one input 231 of an "OR" gate 233. The second gate 230 will receive the address pulses $P_{12}$ to $P_{19}$ and feed them to a second input 235 of the gate 233. The output 237 of the gate 233 is connected to the input of an "OR" gate 240 that is interconnected with a transmitter 239. The gate 240 is connected to the clock 26 and to a flip-flop 242 fed from the gate 230. The flip-flop 242 is set by the space bit pulse $P_0$ and will count the pulses $P_{12}$ to $P_{19}$ and supply a parity pulse $P_{20}$ to the "OR" gate 240 as needed. The transmitter 239 may be adapted to transmit the data in any suitable form such as by electromagnetic radiations.

As was previously pointed out if the data signals *y* are occurring according to a zero order polynomial, i.e. are constant, the first differential $\Delta y$ will always be zero. If the data signals first become a constant at time $k-1$ the first incremental differential $\Delta y_{k-1}$ will be zero, but the first incremental differential $\Delta y_{k-2}$ will not be zero. As a result the output from the branch 78 will provide a signal that will cause the flip-flop 170 to feed a signal to the input 178 of the gate 174. As a result the gate 174 will not provide a signal to the input 180 that would be effective to cause gate 182 to inhibit recording the signal $y_{k-1}$ in the register 69.

If $y_k$ is also constant the differential $\Delta y_k$ will also be equal to zero thereby making $\Delta y$ equal to zero for the second time in a row. If the differential signals $\Delta y_k$ and $\Delta y_{k-1}$ are equal to zero, the gates 72 and 100 will have a zero output and will set the flip-flops 168 and 170 to one. Thus, the inputs 176 and 178 to the "AND" gate 174 will be at one and the output will therefore also be one. This one output signal will be present at the input 180 and will thus cause the "OR" gate to send a one signal to the register to prevent the register 69 recording the signal $y_k$ from the delay line 64. If the data is not occurring according to a zero order polynomial $\Delta y_k$ and $\Delta y_{k-1}$ will not both be equal to zero and one or both flip-flops 168 and 170 will not be set to zero. Thus the "AND" gate 174 will not cause the gate 182 to send an inhibit signal to the register 69.

If the data signals starting with $y_{k-2}$ are occurring according to a first order polynomial the first differential $\Delta y$ cannot be equal to zero two times in a row. However, the second differential $\Delta^2 y$ will become equal to zero at time $k-1$ and will remain there. At least two data signals $y_{k-2}$ and $y_{k-1}$ are required to define the function and accordingly, should be transmitted. However, since they define the function no additional signals need be transmitted. The differential $\Delta^2 y_k$ will also be equal to zero, as will subsequent second differential signals.

If the $\Delta^2 y_k$ on the output 92 is zero, the gate 96 will have a zero output and will set the flip-flop 186 to one. If $\Delta^2 y_{k-1}$ on the output from branch 108 is zero, the gate 128 will have a zero output and will set the flip-flop 188 to one. Thus, both of the inputs to the "AND" gate 190 will be one and the output therefrom will therefore also be one. This one output signal on the input 196 will thus cause the "OR" gate 182 to send a one signal to the register 69 to prevent the register 69 recording the signal $y_k$ from the delay line 64.

If the sample signals $y_{k-2}$, $y_{k-1}$ and $y_k$ are not occurring according to a first or lower order polynomial $\Delta^2 y_k$ and $\Delta^2 y_{k-1}$ will not both be equal to zero. As a consequence, one or both flip-flops 186 and 188 will not be set to one. Thus, the gate 190 will not cause the gate 182 to send an inhibit signal to the register 69.

If the data signals starting with $y_{k-3}$ are occurring according to a second order polynomial, neither the first nor second differentials $\Delta y$ and $\Delta^2 y$ will be equal to zero two times in a row. However, the third differential signal $\Delta^3 y_k$ on the output will become zero. The data signals $y_{k-3}$, $y_{k-2}$ and $y_{k-1}$ occurring prior to $y_k$ will completely define the polynomial and therefore the data signal $y_k$ and subsequent ones will be redundant and need not be transmitted.

When the third differential signal $\Delta^3 y_k$ on the output 118 is zero the gate 122 will have a zero output and will set the flip-flop 202 to one. Similarly, if the third differential $\Delta^3 y_{k-1}$ from branch 108 is zero, the gate 128 will have a zero output and will set the flip-flop 204 to one.

Thus both of the inputs 208 and 210 to the "AND" gate 206 will be at one and the output therefrom will also be one. This one output signal on the input 208 will thus cause the gate 182 to send a one signal to the register 69 to prevent recording the signal $y_k$ from the delay line.

If the data signals $y_{k-3}$, $y_{k-2}$, $y_{k-1}$ and $y_k$ are not occurring according to a second order or lower polynomial, $\Delta^3 y_k$ and $\Delta^3 y_{k-1}$ will not both be equal to zero and as a consequence one or both flip-flops 202 and 204 will not be set to zero. Thus, the "AND" gate 206 will not cause the gate 182 to send a one signal to inhibit the register 69.

If the signals starting with $y_{k-4}$ are occurring according to a third order polynomial, none of the first, second or third order differentials $\Delta y$, $\Delta^2 y$, $\Delta^3 y$ will be equal to zero two times in a row, and the gates 174, 190 and 206 will not affect the transmission. However, the fourth differential signal $\Delta^4 y_k$ on the output 146 will become zero. The sample signals $y_{k-4}$, $y_{k-3}$, $y_{k-2}$ and $y_{k-1}$ occurring prior to $\Delta^4 y_k$ will completely define the polynomial, and will be transmitted. However, all subsequent signals will be redundant and need not be transmitted.

When the fourth differential $\Delta^4 y_k$ on the output 146 is zero the gate 150 will have a zero output and will set the flip-flop 207 to one. Similarly, the fourth differential $\Delta^4 y_{k-1}$ from delay line 160 will be zero and thus the output of the gate 166 will have a zero output and will set the flip-flop 211 to one. Thus, both of the inputs 214 and 216 to the "AND" gate 212 will be one and the output signal therefrom will also be one. This one output signal on the input 218 will thus cause the gate 182 to prevent the register 69 recording the signal $y_k$ from the delay line 64.

If the sample signals $y_{k-4}$, $y_{k-3}$, $y_{k-2}$ and $y_{k-1}$ are not occurring according to a third order or lower polynomial, $\Delta^4 y_k$ and $\Delta^4 y_{k-1}$ will not both be equal to zero. As a consequence, "AND" gate 216 will not cause the gate 182 to send an inhibit signal to the register 69.

It may thus be seen that the foregoing transmitting station will be effective to sense the existence of data that is occurring in a recognizable pattern or according to a formula and to then prevent the transmission of all data as long as the pattern exists. However, it has been found that when the analog signals from the transducers are quantized and converted to a digital form such as a binary coded pulse train, a quantizing error is introduced into the data signal. Normally an error of this nature will remain within acceptable limits when the missing data signals are predicted for only a relatively short interval. However, if the data signals initially transmitted contain a quantizing error, a wide divergence may develop between the actual data values and the predicted value after an extended period of time. Accordingly in order to reduce or eliminate such errors, the embodiment of FIGURE 3 may be employed to insure sufficient data signals to be transmitted to prevent excessive errors.

In this embodiment the transmitting system is substantially identical to the first station up to and including the "OR" gate 182. As a result, if a data signal is occurring according to a recognizable pattern or formula, a one signal will be supplied to one or more of the inputs 180, 196, 208 or 218 and the gate 182 will then send a one signal on the conductor 250 indicating the signal $y$ from the delay line 64 should be inhibited or not recorded in the register 69. As in the previous station these inhibit signals will continually occur each and every time a data signal occurs as long as it is still in the pattern. However, it is desired to transmit a portion of the signals to insure an accurate computation of the signals that were not transmitted. Accordingly an inhibit gate 254 is provided in the line 250 so as to prevent the signal from the gate 182 passing therethrough at preselected times. Although the manner in which this occurs may be varied in the present instance when the inhibiting of the transmission of data signals first commences, the station will operate in a first mode where only every other data signal is transmitted. The station will then operate in a second mode wherein only every fourth data signal is transmitted. Following this the station may operate in a third mode or up to any higher order mode with the sampling period doubling with each mode. Thus, the spacing between the signals that are employed to predict the signals that were not transmitted will become increasingly larger. As a result, the error will be maintained within acceptable limits even though the function continues for protracted periods.

Although there are numerous ways in which the gate 254 may be controlled, in the present instance a shift register 258 is interconnected with a delay line 260 and a logic matrix 262 which in turn controls a flip-flop 264 that is connected to the input 266 of the gate 254.

The shift register 258 is interconnected within the delay line 260 to form a recirculating loop. The shift register 258 is also interconnected with the conductor 250 so as to receive the inhibit signals therefrom.

The shift register 258 and the delay line 260 will be effective to circulate a count around the loop for each of the channels. Normally the count for any given channel will be dropped and reduced to zero when there is no inhibit signal on the conductor 250. However, as long as an inhibit signal does occur on the conductor 250, it will cause the count circulating in the loop to be updated by one during each circulation period.

The logic matrix 262 is adapted to recognize certain predetermined counts and to set and reset the flip-flop 254 in response thereto. The flip-flop 254 will then supply a gating signal to the input 266. Thus, if a gating pulse is supplied to the input 266 at the same time an inhibit pulse is supplied to the input 252 an inhibit pulse will pass through the gates 254 and inhibit register 69 recording the data signal. However, at periodic intervals the count circulating in the shift register will be such as to prevent the flip-flop 264 sending a pulse to the input 266. As a result the inhibit or conductor 250 will not pass through the gate 254 and into the register 69. Thus the data signal occurring at that instant will be recorded even though one or more of the incremental differentials thereof is still at zero.

When employing this embodiment, if data signals $y_1$, $y_2$, $y_3$ and $y_4$ occur according to a third order polynomial, the fourth order differential will become equal to zero and the signal $y_4$ will be recorded in the register 69. When $y_5$ occurs, the differential will be equal to zero for the second time in a row and the signal $y_5$ will also be recorded. When $y_6$ occurs the gate 182 will send an inhibit signal on the line 250. The inhibit signal will be fed to the register 258 and the gate 254. The count circulating in the delay line 260 and register 258 will be updated by one. The logic matrix 262 will recognize the count in the register 258 as a combination such that the data signal should not be recorded. The matrix 262 will then cause the flip-flop 264 to put a signal on the input 266 so that the inhibit signal from the gate 182 may pass through to the register 69. As a result the data signal $y_6$ will not be recorded in the register 69. However, since data signals $y_1$, $y_2$, $y_3$ and $y_4$ were recorded for transmission and since they occurred according to a recognizable pattern or formula, $y_6$ may be predicted therefrom. Any error resulting from the original quantizing of these signals will be negligible.

When the data signal $y_7$ occurs the gate 182 will again put an inhibit signal on the conductor 250 so as to advance the count circulating through the register 258 and delay line 260 by one, and put a pulse on the input 252. The logic matrix will recognize the circulating count as one that should not put a pulse on the input 266 and as a result the data signal $y_7$ will be recorded.

When the data signal $y_8$ occurs, the logic matrix 262 will react to prevent recording of $y_8$ in the register. However, by employing the data signals $y_1$, $y_3$, $y_5$ and $y_7$ the system will be operating in the second mode and employing every other data signal. Thus the signal $y_8$ may be predicted. Since all of these signals are actual transmitted data signals having a sampling period that is double that employed in the original prediction of $y_6$ the quantizing error will still remain low.

The logic matrix 262 will act in a similar manner to cause $y_9$ to be recorded and to prevent recording signals $y_{10}$ to $y_{12}$ inclusive. These signals $y_{10}$, $y_{11}$ and $y_{12}$ however may be predicted by employing every other transmitted data signals $y_1$, $y_3$, $y_5$ and $y_7$.

Similarly the data signal $y_{13}$ may be recorded in the register with the signals $y_{14}$, $y_{15}$ and $y_{16}$ being predicted on the basis of signals $y_1$, $y_5$, $y_9$ and $y_{13}$. This will be the third mode of operation with every fourth data signal being employed. The data signals $y_{17}$ and $y_{25}$ may then be transmitted with the signals $y_{18}$ to $y_{24}$ inclusive being predicted by employing the data values $y_1$, $y_5$, $y_9$ and $y_{13}$ which will still be the third mode of operation. As the function continues to occur according to the same pattern the logic matrix 262 will continue to cause the data signals to be transmitted in successively higher order modes with the period of each mode being double that of the preceding mode, i.e. the frequency of transmission will decrease according to a geometric progression.

The second station 270 which may be disposed remote from the first station includes means for interconnecting the two stations together. In the present instance, this means comprises an antenna 272 and a receiver 274 that is tuned to the frequency upon which the transmitter is operating. The receiver 274 is adapted to demodulate the carrier wave and provide a signal at the output thereof that will correspond to the data signals as they are reproduced by the register 69. Although these received signals will be occurring at a uniform rate, they may be in random order with only a portion of the pulses in any given channel being present.

The output from the receiver 274 may be interconnected with a utilization device 276 such as a data reduction or processing system by means 278 that will expand the data signals to include the signals that were removed by the transmitter station. More particularly, this means 278 includes a storage buffer 280 that is interconnected with the output of the receiver 274 for recording the received data signals. The buffer 280 may comprise a shift register or similar device that is adapted to receive and record the signals at a uniform rate and to reproduce them at a random rate. The random rate of recording will be similar to the rate at which the signals were recorded in the register 69. As a result, it may be seen that the storage buffer 280 may expand the time intervals between the reproduced signals so as to restore them to real time. It should be noted however there will be a time delay in the reproduced signals resulting from the various time delays in the registers, etc.

The storage buffer 280 is operatively interconnected with a programmer control 282 which will be effective to start and stop the buffer so as to control the manner in which the buffer 280 reproduces the signals. The programmer control 282 is operatively interconnected with a clock 284 so as to receive a clock pulse *Cp* therefrom. This clock 284 may be interconnected with the receiver 274 so as to lock into the received signals and provide a clock pulse *Cp* that is a duplicate of the clock pulse in the transmitter.

As will become apparent the programmer control 282 controls the operation of practically all of the other portions of the station 270. The control 282 derives its operating instructions from the data address sequence as presented by the storage buffer 280. As previously stated this control unit 282 will be effective to control the storage buffer 280 and the reproduction of the signals recorded therein.

A computer memory 286 may be provided which is operatively interconnected with the output from the storage buffer 280 and the programmer control 282. Thus when the data signals are reproduced by the buffer 280, they may be read into the memory 286. This memory 286 is preferably of the random access variety wherein the signals may be stored in one order and removed in another order. The manner in which the data signals are removed will be determined by the programmer control 282. The output from the memory 286 is interconnected with one input 288 to a predicter computer 290 and to an input 292 of a differentiating network having three differentiating circuits 296, 298 and 300 therein.

The first differentiating circuit 296 includes two branches 302 and 304 which are interconnected directly with the output of the memory 286 so as to receive the data signals therefrom. One of the branches merely extends directly to one input 306 of a subtractor 308 so as to supply the data signal thereto with little or no time delay. The second branch comprises a delay means such as a delay line or a shift register. This branch 304 is adapted to store the data signal therein for some predetermined time and then to supply this signal to the second input 310 of the subtractor 308. The delay in this branch is preferably substantially equal to the duration of the data signal. The subtractor 308 will be effective to subtract the signal on the first input 306 from the signal on the second input 310. It may thus be seen that if a first signal $y_1$ is supplied to the circuit, the signal $y_1$ will enter the input 306 and emerge from the subtractor 308 as a meaningless value. However, when a second signal $y_2$ is applied to the circuit 296 the signal $y_2$ will arrive at the input 306 at the same time the signal $y_1$ emerges from the second branch 304 and enters the second input. Thus, the subtractor will then provide a difference signal that will be equal to the first incremental differential between the signals $y_1$ and $y_2$.

The second differentiating circuit 298 is preferably substantially identical to the first circuit 296 and includes first and second branches 312 and 314 which interconnect the output from the subtractor 308 with the two inputs 316 and 318 to a second subtractor 320. The first branch 312 is preferably free of any time delay while the second branch 314 includes a shift register or similar device. The second branch 314 will be effective to store the differential signal $\Delta y_1$ therein for a predetermined time delay so that the subtractor 320 will then be effective to subtract the signal $\Delta y_2$ on the input 316 from the signal $\Delta y_1$ on the input 318 and thereby provide an output signal that will be the second order differential $\Delta^2 y_1$.

The third differentiating circuit 300 is also substantially identical to the two preceding circuits 296 and 298 and includes a first branch 322 and a second branch 324 having a time delay or shift register therein. These branches interconnect the output of the subtractor 320 to the two inputs 326 and 328 to the subtractor 330. Thus the output from the third subtractor 330 will be a signal that is equal to the third differential $\Delta^3 y_1$.

Figure 3:
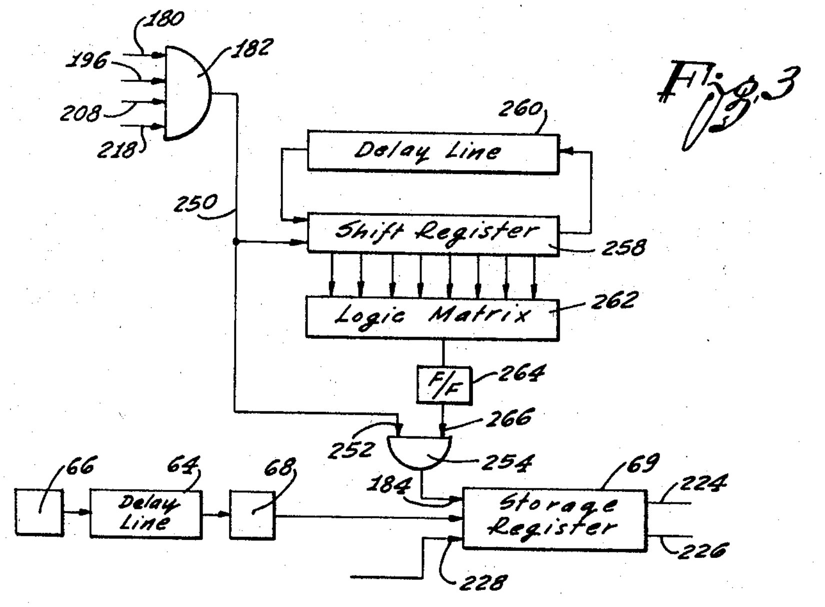
FIGURE 3 is a block diagram of a portion of the transmitting system of FIGURE 1 and showing a modification thereof.
Figure 4:
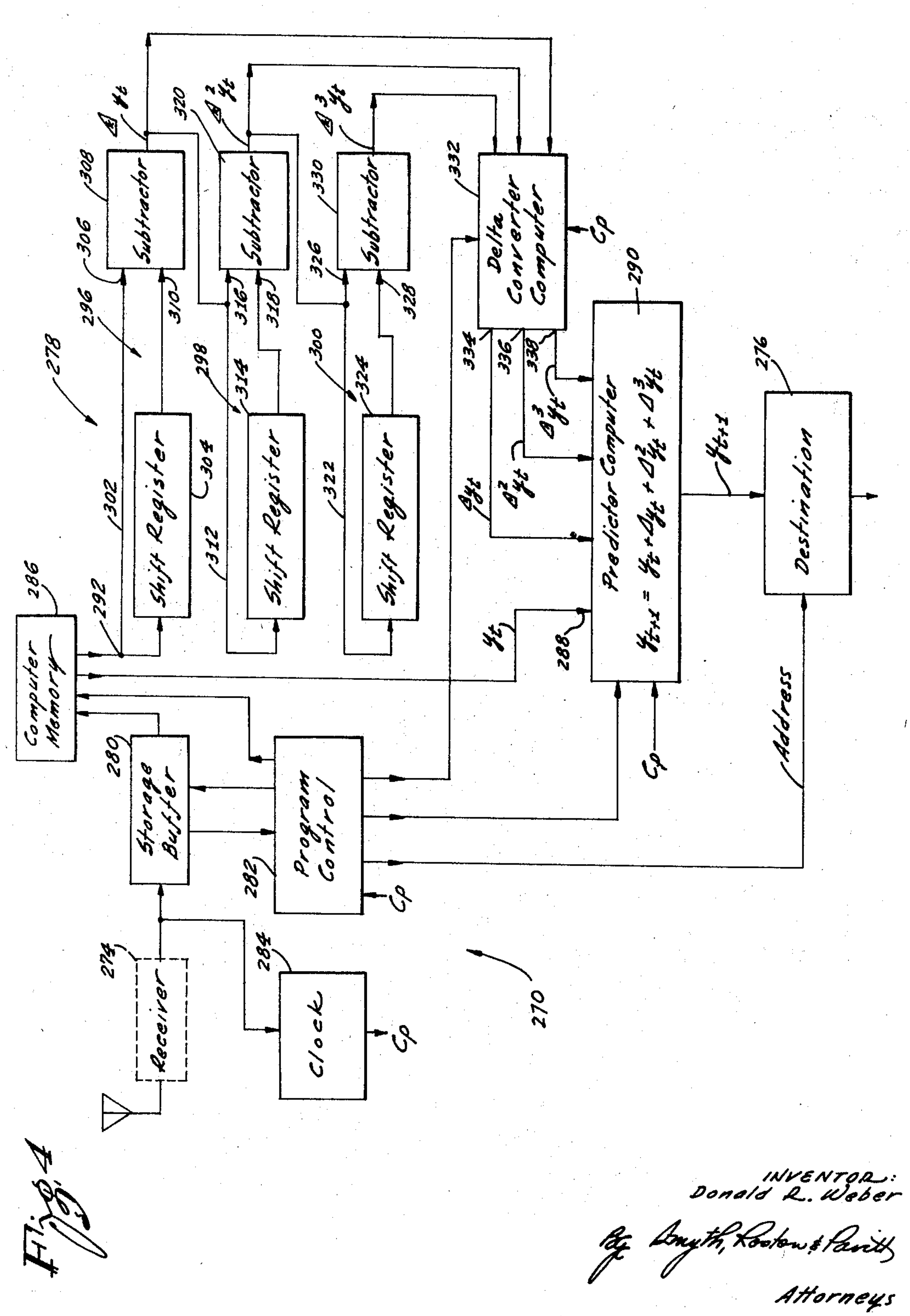
FIGURE 4 is a receiving station for use in the telemetering system.

The outputs of the three subtractors 308, 320, 330 are operatively interconnected with three separate inputs to a delta converter computer 332. This converter computer 332 is thus adapted to receive from the differentiating circuits 296, 298 and 300 the differential signals $\Delta y_k$, $\Delta^2 y_k$ and $\Delta^3 y_k$, where the $k$ designates the mode in which the differentiating circuit is operating. This mode will correspond to the mode in which the transmitter in the embodiment of FIGURE 3 is operating, i.e. whether it is transmitting every other signal, every fourth signal, etc. The delta converter computer 332 has three separate outputs 334, 336 and 338 that will have the first, second and third order differential signals thereon respectively. These differentials will be for the first mode of operation, i.e. they will correspond to the mode when each of the data signals are being transmitted.

It can be shown mathematically that if the differentials are of mode $k$ they can be converted to the first mode by employing the following formulas.

$$\Delta^3 y = A_k \Delta^3 y \quad (1)$$

$$\Delta^2 y = B_k \Delta^2 y + C_k \Delta^3 y \quad (2)$$

$$\Delta y = D_k \Delta y + E_k \Delta^2 y + F_k \Delta^3 y \quad (3)$$

wherein A, B, C, D, E and F are constants that correspond to the values set forth in the following table.

DELTA CONVERSION TABLE

| Constants | Mode | | | | | |
|---|---|---|---|---|---|---|
| | 1 | 2 | 3 | 4 | 5 | 6 |
| $A_k$ | 1 | 1/8 | 1/64 | 1/512 | 1/4096 | 1/32768 |
| $B_k$ | 1 | 1/4 | 1/16 | 1/64 | 1/256 | 1/1024 |
| $C_k$ | 0 | 1/8 | 3/64 | 7/512 | 15/4096 | 31/32768 |
| $D_k$ | 1 | 1/2 | 1/4 | 1/8 | 1/16 | 1/32 |
| $E_k$ | 0 | 1/8 | 3/32 | 7/128 | 15/512 | 31/2048 |
| $F_k$ | 0 | 1/16 | 7/128 | 35/1024 | 155/8192 | 651/65536 |

The predicter computer 290 includes a first input 288 that connects with the memory 286 and three additional inputs 340, 342 and 344 that conect with the three outputs 334, 336 and 338 of the delta converter 332. The predicter computer 290 is adapted to combine the signals on the inputs 340, 342 and 344 to compute the suppressed data signals by combining the various differentials according to the formula:

$$y_{t+1} = y_t + \Delta y_t + \Delta^2 y_t + \Delta^3 y_t \quad (4)$$

Thus, the output from the predicter computer 290 will be a complete series of data signals.

It may thus be seen that when the transmitter is transmitting the signals with the redundant portions removed therefrom, these signals will be received by the receiver 274 in a random order but at a uniform rate. These signals are then recorded in the storage buffer 280 for subsequent reproduction. The reproduction of the signals will be controlled by the program controller 282 and the reproduced signals will have the burst characteristics substantially identical to the manner in which the signals were recorded in the register 69.

For purposes of explanation, assume that the signals starting with $y_1$ occur according to a third order polynomial and that the transmitting station of FIGURE 3 transmits only the signals $y_1$, $y_2$, $y_3$, $y_4$, $y_5$, $y_7$, $y_9$, $y_{13}$, $y_{17}$, $y_{25}$, etc. These signals will be stored in the buffer 280 with the signals $y_1$ through $y_5$ being subsequently reproduced in sequence. These signals will then be read into the computer memory 286 for storage. The computer memory 286 will then feed the signals $y_1$ through $y_5$ directly to the predicter computer 290. These signals will then pass through the computer 290 in an unaltered form to a utilization device or destination 276. At the same time, the signals $y_2$ through $y_5$ will be fed into the differentiating circuits 296, 298 and 300.

The signal $y_2$ will pass through the first branch 302 to the subtractor 308 and also through the branch 304 so as to be delayed by the shift register. The signal $y_3$ will then be fed into the first differentiating circuit 296 so that signal $y_3$ will arrive at the input 310 at the same time that signal $y_3$ arrives at input 306. The subtractor 308 will then form the first incremental differential signal $\Delta y$ and feed the signal into the second differentiating circuit 298. In a similar manner the succeeding signals $y_4$ and $y_5$ will be fed into the differentiating circuits 296, 298 and 300 so as to load them up and cause them to produce the first, second and third incremental differential signals $\Delta y_5$, $\Delta^2 y_5$ and $\Delta^3 y_5$. These differential signals will be of the first mode and accordingly will be fed directly through the delta converter computer 332 to the predicter computer 290. These signals $\Delta y_5$, $\Delta^2 y_5$ and $\Delta^3 y_5$ will then be added to $y_5$ to provide an output signal which is equal to $y_6$. Following this, the computer memory 286 as directed by the control 282 will feed the received signal $y_7$ directly through the predicter computer 290.

Following this the station 270 will then operate in the second mode and will employ the signals $y_1$, $y_3$, $y_5$, and $y_7$ for predicting the values of signals $y_8$ and $y_{10}$ through $y_{12}$ inclusive. It may be remembered that signal $y_9$ was a transmitted signal and need not be computed. The computer 290 so that the signals $y_8$, $y_{10}$, $y_{11}$ and $y_{12}$ can be into the differentiating circuits 296, 298 and 300. When these circuits are loaded with these signals, the first, second and third order incremental differentials for the second mode will be provided by the subtractors 308, 320 and 330. These signals $\Delta y$, $\Delta^2 y$ and $\Delta^3 y$ will then be fed to the delta converter computer 332. The converter computer 332 will then operate on the second mode differential signals according to the Formulas 1, 2 and 3 and the conversion table to thereby compute the first, second and third order differentials of the first mode. The first mode differentials will then be fed to the predicter computer 290 so that the signals $y_8$, $y_{10}$, $y_{11}$ and $y_{12}$ can be computed. Since in the present example it is assumed that the data is occurring according to a third order polynomial, the first mode third order differential $\Delta^3 y$ will be a constant. The first mode second order differential $\Delta^2 y_t$ will be equal to the difference between the third order differential $\Delta^3 y_{t-1}$ and the second order differential $\Delta^2 y_{t-1}$. The first mode first order differential $\Delta y_t$ will be equal to the difference between the second order differential $\Delta^2 y_{t-1}$ and the first differential $\Delta y_{t-1}$. Thus, once the value of $y_8$ is obtained the predicter computer can keep up dating the first mode differentials to predict the signals $y_{10}$, $y_{11}$ and $y_{12}$.

The station 270 will then operate in the third mode with the computer memory 286 feeding the signals $y_1$, $y_5$, $y_9$ and $y_{13}$ into the differentiating circuits 296, 298 and 300. Once the differentiating circuits are loaded with these signals, they will successively differentiate the signals $y_1$, $y_5$, $y_9$ and $y_{13}$ to thereby provide the first, second and third order incremental differentials of the third mode. These differentials will then be fed through the delta converter computer 332 where they will be converted to the first, second and third order differentials of the first mode according to the Formulas 1, 2 and 3 and the conversion table. The predicter computer 290 will then utilize these differentials to compute the signals $y_{14}$ to $y_{16}$ and $y_{18}$ to $y_{23}$ ($y_{19}$ being a transmitted signal).

Following this, if the signals are still occurring according to the original polnominal, the station 270 will operate in the fourth mode so as to utilize the signals $y_1$, $y_9$, $y_{17}$ and $y_{25}$ to provide the fourth mode incremental differentials. The delta converter computer may convert these signals into the first mode differentials whereby the predicter may predict the signals $y_{14}$ through $y_{24}$ inclusive. Similarly, as long as the signals $y$ continue to occur according to the polynomial, the transmitting station will progressively switch to higher modes and will increase the intervals between the transmitted signals according to a geometric progression or according to any other desired program. At the same time, the computer memory 286 will feed the signals corresponding to the mode of opertaion into the differentiating circuits 296, 298 and 300 and the converter computer 332 will then compute the new first mode differentials so that the predictor computer may compute the missing data signals ad infinitum.

It may thus be seen that a bandwidth compression system has been provided that may be used for transmitting data signals such as used in television systems, telemetering systems and any other suitable systems. Although only a limited number of embodiments of the present invention are disclosed, it will be readily apparent to a person skilled in the art that numerous changes and modifications may be made thereto without departing from the invention. For example, redundancy resulting from various types of functions such as periodic, exponential, etc. may be eliminated if desired. Also, the means for recognizing redundancy and the means for computing the non-transmitted signals may be modified. Furthermore, if so desired, the missing signals may be obtained by interpolation rather than by extrapolation as presently disclosed. Accordingly, the foregoing description and drawings are merely explanatory of the invention and are not intended in any way to limit the invention which is defined only by the claims which follow.

What is claimed is:

1. Bandwidth compression means for operating upon an input signal having variable characteristics, including:
input means for receiving the input signal;
first means operatively connected to said input means for delaying said input signals;
second means operatively coupled to said delaying means for comparing successive portions of said input signal to determine whether such successive portions of said input signal are varying in a predictable pattern and to provide control signals indicative of changes in such successive portions of such signal from such predictable pattern;
third means operatively interconnected with said second means and responsive to said control signals to pass only the successive portions of the input signal indicative of changes in the predictable pattern; and
fourth means operatively interconnected with said third means for using the signals passed by said third means.

2. The bandwidth compression means set forth in claim 1 wherein
the fourth means constitutes transmitting means and wherein fifth means are included for receiving said signals and wherein register means are operatively interconnected with said receiving means for recording said received signals and wherein sixth means are operatively interconnected with said register means and responsive to said recorded signals for predicting the signals not passed by the third means and wherein seventh means are provided for inserting the predicted signals into proper position in the sequence of signals stored in the register means.

3. Bandwidth compression means for operating upon an input signal having variable characteristics, including:
input means for receiving the input signal;
first means operatively interconnected with said input means and responsive to said input signal to periodically sample said input signal and provide a series of sample signals;
second means responsive to said sample signals to obtain signals representing the differentials of successive order between the successive sample signals to thereby indicate when said input signal is varying in a predictable pattern;
third means responsive to the successive signals representing the differentials of each particular order for providing signals representing changes in such differentials to provide indications when said input signal is varying in a predictable pattern;
fourth means for using successive samples of the input signal; and
control means operatively interconnected with said fourth means and said third means, said control means being responsive to said signals from said third means to prevent the use of successive samples of said input siganl when such successive samples of said signal are varying in the predictable pattern.

4. The bandwidth compression means set forth in claim 3 wherein
fifth means are provided at a displaced position for receiving the signals provided by the fourth means and wherein sixth means are operatively coupled to the fifth means for predicting from the received signals the signals prevented by the control means from use by the fourth means and wherein seventh means are operatively coupled to the sixth means for operating upon the received signals to insert into the sequence of the received signals the signals predicted by the sixth means.

5. Bandwith compression means for operating upon an input signal having variable characteristics, including:
input means for receiving the input signal;
first means operatively interconnected with said input means and responsive to said input signal to periodically sample said input signal and provide a series of digital signals representing said input signal within less than a predetermined quantizing error;
second means responsive to said digital signals to obtain signals representing incremental differentials of successive order between the successive digital signals whereby at least one of such incremental differentials will become equal to zero when said input signal is varying in a predictable pattern;
third means operatively coupled to said second means for providing signals indicating when the signals representing the incremental differentials of successive order between the successive digital signals becomes zero;
fourth means operatively interconnected with said second means for using at least portions of said digital signals; and
control means operatively interconnected with said third means to be responsive to said signals indicating said incremental differentials, said control means being interconnected with said fourth means to provide for the use of said digital signals by said fourth means only when said signals representing said incremental differentials are different from zero and to prevent the use of the digital signals by the fourth means when at least one of said signals representing said incremental differentials is substantially zero.

6. The bandwidth compression means set forth in claim 5 wherein
fifth means are provided for receiving the signals provided by the fourth means and wherein sixth means are operatively coupled to the fifth means for predicting in digital form from the received signals the signals prevented by the control means from use by the fourth means and wherein seventh means are operatively coupled to the sixth means for inserting into the received signals the signals as predicted by the sixth means in digital form and wherein eighth means are provided for converting the signals in digital form from the seventh means to a corresponding analog signal.

7. Bandwidth compression means for operating upon a plurality of input signals each having variable characteristics, including:
input means for receiving the plurality of input signals with each of said signals being independent of the other signals and free to vary throughout predetermined ranges;
first means operatively interconnected with said input means for processing each signal in sequence to convert each signal to a digital form;
second means operatively interconnected with said first means and responsive in sequence to each of said input signals in digital form to provide at successive periods of time a separate control signal having characteristics to indicate whether the respective input signal in digital form is varying in a predictable pattern at that time;

third means operatively interconnected with said input means for successively using at least portions of each of said input signals in digital form; and control means operatively interconnected with said transmitting means and with said second means, said control means being responsive to each of said control signals to prevent the use of portions of said input signals in digital form that are occurring in a predictable pattern and to provide for the use of all of those portions of the input signals in digital form that are occurring in an unpredictable pattern.

8. The bandwidth compression means set forth in claim 7 wherein fourth means are provided for receiving the signals used by the third means and wherein fifth means are operatively coupled to the fourth means for predicting in digital form from the signals in digital form from the fourth means the signals prevented by the control means from use by the fourth means and wherein sixth means are operatively coupled to the fifth means for inserting into the sequence of the signals received by the fourth means the signals in digital form as predicted by the fifth means and wherein seventh means are operatively coupled to the sixth means for converting into analog form the signals provided by the fourth and sixth means in digital form to restore the input signal.

9. Bandwidth compression means for operating upon an input signal having variable characteristics, including:

input means for receiving the input signal;

first means operatively coupled to the input signal for converting the input signal into a digital form at progressive periods of time;

second means operatively coupled to the first means for determining changes in the input signal in digital form at progressive instants of time to provide signals representing differentials of progressively increasing order;

third means operatively coupled to the second means for operating upon the signals from the second means to provide signals indicating whether the input signal is occurring in a predictable pattern at successive instants of time in accordance with polynomials of progressively increasing significance;

fourth means operatively interconnected with said third means and responsive to said signals from said third means to provide a control signal when said input signal is varying according to the predictable pattern at successive instants of time in accordance with the polynomials of progressively increasing significance;

a storage register operatively interconnected with said first means for storing said input signals in digital form, said register being operatively interconnected with said fourth means and responsive to said control signal to store only those portions of said input signal in digital form that are not occurring according to the predictable pattern; and fifth means operatively interconnected with said register for extracting for use the signals stored in said register.

10. The bandwidth compression means set forth in claim 9 wherein sixth means are provided for receiving the signals extracted by the fifth means for use and wherein seventh means are operatively coupled to the sixth means for determining changes in the signals in digital form from the seventh means at progressive instants of time to provide signals representing differentials of progressively increasing value and wherein eighth means are provided for operating upon the signals from the seventh means to provide signals indicating whether the signals from the seventh means are occurring in a predictable pattern and wherein ninth means are responsive to the signals from the eighth means to insert signals in digital form into the signals from the seventh means to convert the signals from the sixth means into a form corresponding to the signals from the first means and wherein tenth means are responsive to the signals from the ninth means to reproduce the input signal.

11. Bandwith compression means for operating upon a plurality of input signals each having variable characteristics, including:

input means for receiving the input signals;

first means operatively coupled to the input means for providing a sequential presentation of such signals;

commutator means operatively interconnected with said first means for periodically sampling each of said input signals upon the presentation of each such input signal to provide a series of periodic sample signals for each such input signal;

second means operatively coupled to the commutator means for converting each of the periodic sample signals to a plurality of signals digitally representing the periodic sample signals;

third means operatively interconnected with said second means and responsive to the digital signals in each of said periodic samples to obtain signals representing differentials of progressively increasing orders for each of said series;

fourth means operatively coupled to the third means for comparing successive signals representing differentials of the same order for each of said series to provide control signals indicating when the sample signals in each of the series are varying in a predictable pattern;

a register operatively interconnected with said commutator means for storing said sample signals, said register being operatively interconnected with said fourth means and responsive to each of said control signals to store only the digital signals not occurring according to a predictable pattern in each series and for inhibiting any recording of at least a portion of the digital signals occurring according to a predictable pattern in each series; and means operatively interconnected with said register for extracting and using the signals stored in said register.

12. Bandwidth compression means for operating upon a plurality of input signals each having variable characteristics including:

input means for receiving the input signals;

first means operatively coupled to the input means for sequentially presenting the input signals for processing;

commutator means operatively interconnected with said first means for periodically sampling each of said analog signals in accordance with the sequential presentation of such signals to thereby provide a plurality of series of periodic sample signals;

second means operatively coupled to said commutator means for converting each of the sampled signals to a plurality of signals digitally representing such sampled signals;

third means operatively interconnected with said second means for comparing successive ones of said sample signals in digital form to determine differences between such signals;

fourth means opreatively interconnected with said third means and responsive to said difference signals to provide signals representing differentials of progressive order between the successive digital signals for each series;

fifth means operatively coupled to the fourth means and responsive to the signals representing successive differentials of each particular order for determining whether such differentials have a value equal to or different from zero and for providing signals representing such value;

a register operatively interconnected with the second means for storing signals, said register being operatively interconnected with said fifth means and responsive to said signals from the fifth means for recording the digital signals in the series from the second means when the signals from the fifth means represent values different from zero and for inhibiting the recording of the digital signals in the series from the second means when at least one of the signals from the fifth means for that series represents a value substantially equal to zero; and sixth means operatively interconnected with said register for extracting and using the signals which are recorded within said register.

13. Bandwidth compression means for operating upon an input signal having variable characteristics, including:

input means for receiving the input signal;

first means operatively interconnected with said input means for periodically sampling said input signal to provide a series of periodic sample signals for the input signal;

second means operatively interconnected with said first means for converting each of said sample signals into a sereis of digital signals periodically representing said sample signal;

third means operatively interconnected with said second means and responsive to successive series of the digital signals to provide signals representing at least a first order differential for each series;

fourth means operatively interconnected with said third means and responsive to successive signals from the third means to provide signals representing a second order differential for each series; and register means operatively interconnected with said second means for storing the digital signals;

said register means being responsive to said signals from said third and fourth means to store portions of each series of digital signal different from a predictable pattern and to inhibit the recording of at least some of the digital signals during the occurrence of the digital signals in a predictable pattern.

14. Bandwith compression means for operating upon an input signal having variable characteristics, including:

input means for receiving the input signal;

first means operatively coupled to said input means for periodically sampling the input signal;

second means operatively coupled to said first means for comparing successive samplings of the input signal to provide signals representing the difference between such successive samplings;

third means operatively coupled to said second means for comparing the signals representing successive differences to provide signals representing a first polynomial in the characteristics of the input signal;

fourth means operatively coupled to said second means for comparing successive differences in the successive samplings to provide signals representing successive differentials between such successive differences;

fifth means operatively coupled to said fourth means for comparing the signals representing the successive differentials to provide signals representing a second polynomial in the characteristics of the input signal;

sixth means operatively interconnected with said third and fifth means to determine when said sampled signal is occurring in accordance with the characteristics of the signals representing the first and second polynomials; and seventh means operatively interconnected with said sixth means and responsive to said periodic samplings of the input signal to inhibit the presentation of the input signal in the predictable pattern.

15. The bandwidth compression means set forth in claim 14 wherein eighth means are provided for receiving the signals passed by the seventh means and wherein ninth means are provided for comparing successive samplings of the signals from the eighth means to provide signals representing the difference between such successive samplings and wherein tenth means are operatively coupled to the ninth means for comparing the signals representing successive differences to provide a signal representing the first polynomial in the characteristics of the input signal and wherein eleventh means are operatively coupled to the tenth means for comparing successive differences in the successive samplings to provide signals representing successive differentials between such successive differences and wherein twelfth means are operatively coupled to the eleventh means for comparing the signals representing the successive differentials to provide signals representing a second polynomial in the characteristics of the input signal and wherein thirteenth means are operatively coupled to the tenth and twelfth means for determining when the signals received by the eighth means are occurring in the predictable pattern and fourteenth means operatively coupled to the thirteenth means and responsive to the signals received by the eighth means for inserting into the sequence of such signals the signals predicted by the thirteenth means.

16. Bandwidth compression means for operating upon an input signal having variable characteristics, including:

first means for receiving the input signal;

second means operatively coupled to the first means for sampling the input signal at periodic intervals;

third means for operating upon the successive samplings of the input signal to provide signals representing differences of progressively increasing polynomials;

fourth means for comparing successive signals representing the differences of each particular polynomial to provide control signals for the differences of that particulate polynomial;

fifth means responsive to the control signals for the differences of each particular polynomial to provide control signals indicating the occurrence of the sampled signals in an unpredictable pattern; and sixth means operatively interconnected with said fifth means and responsive to the sampled signals to provide for the passage of the sampled signals occurring in an unpredictable pattern.

17. The bandwidth compression means set forth in claim 16 wherein seventh means are provided for receiving the signals passed by the sixth means and wherein eighth means are operatively coupled to the seventh means for operating upon successive signals from the seventh means to provide signals representing differences of progressively increasing polynomials and wherein ninth means are operatively coupled to the eighth means to predict the signals occurring in the predictable pattern and wherein tenth means are operatively coupled to the ninth means for insertnig into the signals received by the seventh means the signals predicted by the eighth means to reconstitute the input signal.

18. Bandwidth compression means for operating upon an input signal having variable characteristics, including:

first means for receiving the input signal;

second means operatively coupled to the first means for sampling the input signal at periodic intervals;

third means operatively coupled to the second means for converting each of the sampled signals into a plurality of signals digitally representing the sampled signal;

fourth means operatively coupled to the third means for operating upon each of the plurality of signals from the third means to provide signals representing differentials of progressively increasing order;

fifth means for comparing successive signals representing the differentials of each particular order to provide control signals for the differentials of that order;

sixth means responsive to the signals from the fifth means to determine when the successive samplings of the input signal have an unpredictable pattern; and seventh means operatively coupled to the sixth means for passing only the sampled signals having an unpredictable pattern.

19. Bandwidth compression means for operating upon an input signal having variable characteristics, including:

first means for receiving the input signal;

second means operatively coupled to the first means for periodically sampling the input signal;

third means operatively coupled to the second means for converting each sampling of the input signal to a plurality of signals digitally representing the input signal at the sampling;

a register operatively interconnected with said receiving means for storing said digital signals in the successive samplings;

fourth means responsive to the digital signals in the successive samplings to provide signals representing differentials of progressive order between the digital signals in the successive samplings to indicate when said sampled signals represent a polynomial function;

fifth means operatively coupled to the fourth means for operating upon the signals from the fourth means to provide signals indicating whether the differentials of each progressive order have a value equal to or different from zero; and sixth means operatively interconnected with the register and responsive to the signals from the fifth means for passing into the register the digital signals in the successive samplings in accordance with the indications by the signals from the fifth means as to whether the differentials of each progressive order have a value equal to or different from zero.

20. The bandwith compression system set forth in claim 19 wherein seventh means are included for receiving the signals from the register and wherein eighth means are operatively coupled to the seventh means to produce the signals representing the differentials of progressive order between the digital signals in the successive samplings and wherein ninth means are operatively coupled to the seventh and eighth means for using the signals from the eighth means to reconstitute the signals provided by the third means and wherein tenth means are operatively coupled to the ninth means for converting the signals from the ninth means to the input signal.

21. In a bandwith compression system for operating upon an input signal having variable characteristics to periodically sample the input signal and provide a series of sampled signals and to obtain from the sampled signals signals representing the differentials of successive order between the successively sampled signals and to provide for the use of signals representing changes in such differentials for an indication when the input signal is varying in a predictable pattern and to prevent the use of successive samples of the input signal when the successive samples of the input signal are varying in the predictable pattern, means for reconstructing the input signal, including:

first means for receiving the successive samples of the input signal that are used;

second means operatively coupled to the second means for operating upon the received signals to obtain signals representing the differentials of successive order between the successively sampled signals;

third means responsive to the signals from the second means for predicting from such signals the signals prevented from use; and fourth means operatively coupled to the third means for operating upon the received signals to insert into the sequence of the received signals the signals predicted by the third means.

22. In a bandwith compression system for operating upon an input signal having variable characteristics to periodically sample the input signal and provide a series of digital signals representing the input signal and to provide from the digital signals signals representing incremental differentials of successive order between the successive digital signals whereby at least one of the incremental differentials will become equal to zero when the input signal is varying in a predictable pattern and to provide signals indicating when the signals representing the incremental differentials of successive order between the successive digital signals become zero and to provide for the use of the digital signals only when the signals representing the incremental differentials are different from zero and to prevent the use of the digital signals when at least one of the signals representing the incremental differentials are substantially zero, means for restoring the input signal, including:

first means for receiving the signals passed when the signals representing the incremental differentials are different from zero;

second means responsive to the received signals for producing signals representing incremental differentials of successive order between the successively received digital signals whereby at least one of such incremental differentials will become equal to zero when the input signal is varying in a predictable pattern;

third means operatively coupled to the second means for providing signals indicating when the signals representing the incremental differentials of successive order between the successive digital signals becomes zero;

fourth means operatively coupled to the third means for predicting successive samples of the input signals in digital form when the signals representing the incremental differentials of successive order between the successive digital signals becomes zero;

fifth means operatively coupled to the fourth means for inserting into the successive samples of the digital signal the signals predicted in a digital form by the fourth means to restore the series of digital signals representing the input signal; and sixth means operatively coupled to the fifth means for converting the series of digital signals into the input signal.

23. In a bandwidth compression system for operating upon an input signal having variable characteristics to convert the input signal into a digital form at progressive periods of time and to determine changes in the input signal in digital form at progressive instants of time for providing signals representing differentials of progressively increasing order and to provide from the signals representing the differentials of progressively increasing order signals indicating whether the input signal is occurring in a predictable pattern at successive instants of time in accordance with polynomicals of progressively increasing significance and to provide a control signal when the input signal is varying according to the predictable pattern at successive instants of time in accordance with the polynomials of progressively increasing significance and to use only those portions of the input signal in digital form that are not occurring according to the predictable pattern, means for converting the used signals to the input signal, including:

first means for receiving the used signals;

second means operatively coupled to the first means for determining changes in the received signals at progressive instants of time to provide signals representing differentials of progressively increasing order;

third means operatively coupled to the second means for operating upon the signals from the second means to provide signals indicating whether the received signal is occurring in a predictable pattern at successive instants of time in accordance with the polynomials of progressively increasing significance;

fourth means operatively interconnected with the third means and responsive to the signals from the third means to provide a control signal for controlling the insertion of signals into the received signal in accordance with the polynomials of progressively increasing significance;

fifth means operatively coupled to the fourth means for inserting into the received signals the signals predicted by the fourth means to restore the input signal in digital form; and sixth means operatively coupled to the fifth means for restoring the input signal from the input signal in digital form.

24. In a bandwidth compression system for operating upon a plurality of input signals each having variable characteristics to provide a sequential presentation of such signals and to periodically sample each of the input signals upon the presentation of such signals for providing a series of periodic sample signals for each input signal and to convert each of the periodic sample signals to a plurality of signals digitally representing the periodic sample signals and to obtain from the digital samples, in each of the periodic samples, signals representing differentials of the same order for each of the series for providing control signals indicating when the sample signals in each of the series are varying in a predictable pattern and to use only the digital signals not occurring according to the predictable pattern in each series and to inhibit any recording of at least a portion of the digital signals occurring according to the predictable pattern in each series, means for restoring the plurality of input signals, including:

first means for receiving the signals used in each series;

second means operatively coupled to the first means for periodically sampling the input signals received by the first means in each series to provide a series of periodic sample signals for each input signal;

third means operatively coupled to the second means for converting each of the periodic sample signals to signals representing differentials of progressively increasing orders for each of the series;

fourth means operatively coupled to the third means for comparing successive signals representing differentials of the same order for each of the series to provide control signals indicating when the sample signals in each of the series are varying in a predictable pattern;

fifth means operatively coupled to the fourth means for inserting into the sampled signals in each of the series signals varying in the predictable pattern in accordance with the control signals indicating when the sample signals in each of the series are varying in the predictable pattern; and sixth means operatively coupled to the last mentioned means for converting the signals in digital form to the input signals.

25. In a bandwidth compression system for operating upon an input signal having variable characteristics to periodically sample the input signal for providing a series of periodic sample signals for the input signal and to convert each of the sample signals into a series of digital signals periodically representing the sample signal and to provide signals representing at least a first order differential for each series of digital signals periodically representing the sample signal and to provide signals representing a second order differential for each series from the signals representing the first order differential for each series and to inhibit the use of at least some of the digital signals in accordance with the signals representing the first order differential and the signals representing the second order differential means for restoring the input signal, including:

first means for receiving the digital signals periodically representing the sample signal and not inhibited in accordance with the signals representing the first order differential and the signals representing the second order differential;

second means operatively interconnected with the first means to provide signals representing at least a first order differential from the received signals;

third means operatively interconnected with the second means and responsive to successive signals from the second means to provide signals representing a second order differential for each series;

fourth means operatively interconnceted with the second and third means for inserting into the received signals at particular times digital signals representing the sample signal at such times; and fifth means operatively interconnected with the fourth means for converting the signals from the fourth means into the input signal.

26. In a bandwidth compression system for operating upon an input signal having variable characteristics to periodically sample the input signal and to compare successive samplings of the input signal to provide signals representing the difference between such successive samplings and to compare the signals representing successive differences for providing signals representing a first polynomial in the characteristics of the input signal and to compare successive differences in the successive samplings to provide signals representing successive differentials between such successive differences and to compare the signals representing successive differentials for providing signals representing a second polynomial in the characteristics of the input signal and to determine when the sampled signals occur in accordance with the characteristics of the signals representing the first and second polynomials and to inhibit the presentation of the input signal in accordance with the determination as to when the sampled signal is occurring in accordance with the characteristics of the signals representing the first and second polynomials, means for restoring the input signal, including:

first means for receiving the periodically sampled input signal not inhibited in accordance with the characteristics of the signals representing the first and second polynomials;

second means operatively coupled to the first means for comparing successive sampling of the received input signal to provide signals representing the difference between such successive samplings;

third means operatively coupled to the second means for comparing the signals representing successive differences to provide signals representing a first polynomial in the characteristics of the input signal;

fourth means operatively coupled to the second means for comparing successive differences in the successive samplings to provide signals representing successive differentials between such successive differences;

fifth means operatively coupled to the fourth means for comparing the signals representing the successive differentials to provide signals representing a second polynomial in the characteristics of the input signal;

sixth means operatively coupled to the third and fifth means to determine when the received signal is occurring in accordance with the characteristics of the signals representing the first and second polynomials;

seventh means operatively interconnected with the sixth means for inserting signals in to the received signals in accordance with the determinations of the sixth means; and eighth means operatively interconnected with the seventh means for converting the signals from the seventh means into the received signal.

References Cited

UNITED STATES PATENTS

| | | | |
|---|---|---|---|
| 2,681,385 | 6/1954 | Oliver | 179—15.55 |
| 2,803,702 | 8/1957 | Ville et al. | 332—11 |
| 2,850,574 | 9/1958 | Kretzmer | 178—6 |
| 2,897,275 | 7/1959 | Bowers | 332—11 |
| 2,921,124 | 1/1960 | Graham | 179—15.55 |
| 2,921,740 | 1/1960 | Dobbins | 235—197 |
| 2,949,232 | 8/1960 | Spencer | 235—183 |
| 2,955,710 | 10/1960 | Piatt et al. | 235—61.7 |
| 2,963,551 | 12/1960 | Schreiber | 179—15.55 |

DAVID G. REDINBAUGH, *Primary Examiner.*

S. J. GLASSMAN, W. S. FROMMER, *Assistant Examiners.*